United States Patent [19]
Lowe

[11] Patent Number: 5,764,138
[45] Date of Patent: Jun. 9, 1998

[54] RF IDENTIFICATION SYSTEM FOR PROVIDING STATIC DATA AND ONE BIT OF VARIABLE DATA REPRESENTATIVE OF AN EXTERNAL STIMULUS

[75] Inventor: Peter R. Lowe, Colorado Springs, Colo.

[73] Assignee: HID Corporation, Irvine, Calif.

[21] Appl. No.: 235,073

[22] Filed: Apr. 29, 1994

[51] Int. Cl.$^6$ .................................................... B60C 23/02
[52] U.S. Cl. .................... 340/447; 340/572; 340/825.54; 73/146.2; 200/61.22; 342/51
[58] Field of Search ...................... 340/442, 445, 340/447, 572, 573, 825.54, 825.69, 825.72; 73/146.2, 146.8; 200/61.22; 342/51

[56] References Cited

U.S. PATENT DOCUMENTS

| | | | |
|---|---|---|---|
| 4,730,188 | 3/1988 | Milheiser | 340/825.69 |
| 4,978,941 | 12/1990 | Brown | 340/447 |
| 5,461,385 | 10/1995 | Armstrong | 342/42 |
| 5,541,574 | 7/1996 | Lowe et al. | 340/447 |

*Primary Examiner*—Jeffery Hofsass
*Assistant Examiner*—Daniel J. Wu
*Attorney, Agent, or Firm*—Rodney F. Brown

[57] ABSTRACT

An RF identification system for generating data indicative of an item that is tagged, and one bit of variable data representative of an external stimulus. An ID code reader is provided and an RF identification tag is coupled to the item that is to be monitored and the ID code reader queries the tag. The tag comprises two RF transponder chips that store a data relating to the item, and an excitation coil coupled thereto. A switch is coupled to the chips and excitation coil, and a capacitor is coupled across the switch. A sensor is coupled to the switch for generating one bit of variable data representative of an external stimulus, such as the pressure in a tire. The ID code reader comprises an exciter and RF excitation coil, and a receiver and an RF receiver coil. The receiver includes phase detection circuitry for detecting a state of the switch by detecting the phase shift between signals received from each of the transponder chips. When the switch is shorted, the effect of the capacitor is nullified. When the switch is is open, then the return signal from the second transponder chip has a small phase shift with respect to the signal from the first transponder chip. The phase detection circuitry detects this phase shift and determines the state of the switch. The system permits the use of an RF identification tag in remote or inaccessible positions to determine the state of a variable (the position of the switch) and store identification data. An example of this is an identification tag in a vehicle tire that stores the tire ID and also enables the reading of a pressure switch to confirm adequate tire pressure.

12 Claims, 1 Drawing Sheet

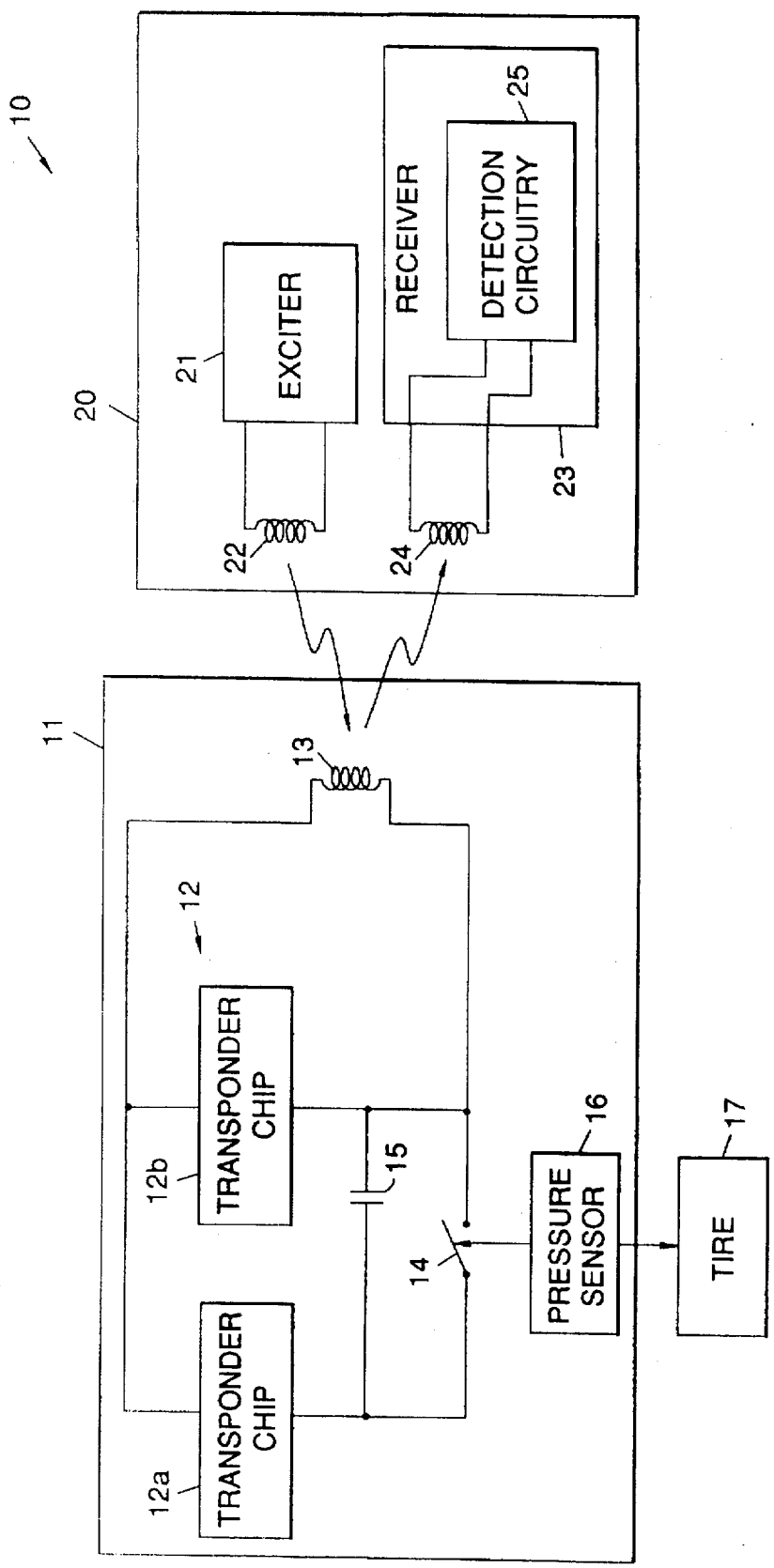

RF IDENTIFICATION SYSTEM FOR PROVIDING STATIC DATA AND ONE BIT OF VARIABLE DATA REPRESENTATIVE OF AN EXTERNAL STIMULUS

BACKGROUND

The present invention relates generally to RF identification systems, and more particularly, to an RF identification system that that provides static data indicative of an item that is tagged and one bit of variable data representative of an external stimulus.

The assignee of the present invention develops and manufactures radio frequency (RF) identification systems that include a passive-type identification tag and an ID code reader. The passive-type identification (ID) tag comprises an RF transponder includes an antenna and is placed on an item that is to be monitored. The RF transponder contains an ID code and other static information or data relating to the item that is to be monitored. The ID code reader comprises an exciter and RF transmit antenna and a receiver and RF receive antenna. The ID code reader queries the identification tag using a transmitted RF signal generated by the exciter. The transponder chip responds to the transmitted RF signal or query from the exciter and an ID code or static data is read out of the transponder chip by way of the RF antenna coupled thereto. The ID code reader receives the ID code and/or data from the transponder chip and processes the information to provide relevant information to a user about the item that is tagged.

The assignee of the present invention has developed a new dual-chip RF identification system. This RF identification system is described in U.S. patent application Ser. No. 08/243,332, filed on Apr. 29, 1994, now abandoned, entitled "RF Identification System that Processed Data From Two RF/ID Chips", assigned to the assignee of the present invention. This invention provides the ability to obtain multiple or combined sets of static data regarding a tagged item using an identification tag containing a plurality of RF transponder chips. Although this multiple transponder chip identification tag provides improved performance, it has been found that it would be desirable to monitor certain variable data associated with a tagged item as well as the static data stored in the transponder chips. In particular, the RF identification system may be used for tire identification, for example. In this application, it has been determined that it would also be desirable to have the ability to monitor tire pressure in addition to the normally stored data. Heretofore, no RF identification systems exist that can provide pressure measurement data, or other variable data representative of an external stimulus, and static data relating to tagged tires.

Therefore, it is an objective of the present invention to provide for an RF identification system that that provides static data indicative of an item that is tagged and one bit of variable data representative of an external stimulus.

SUMMARY OF THE INVENTION

In order to meet the above and other objectives, the present invention is an RF identification system for generating data indicative of an item, such as a tire, for example, that is tagged, and one bit of variable data representative of an external stimulus, such as pressure in the tire, for example. The system comprises an RF identification tag that is coupled to an item that is to be monitored and an ID code reader. The RF identification tag includes first and second RF transponder chips that each store a data relating to the item that is to be monitored. An excitation coil is coupled to outputs of the first and second RF transponder chips. A switch is coupled between the transponder chips and is coupled to the excitation coil, and a capacitor is coupled across the switch. A sensor is coupled to the switch for generating one bit of variable data representative of the external stimulus. The ID code reader comprises an exciter, an RF excitation coil coupled to the exciter, a receiver, and an RF receiver coil coupled to the receiver. The receiver includes phase detection circuitry for detecting the state of the switch by detecting the phase shift between signals received from each of the transponder chips.

In operation, the ID code reader queries the RF identification tag using a transmitted RF signal generated by the exciter. The transponder chips respond to the transmitted RF signal or query, and the ID code or other data is read out of the transponder chips. The receiver in the ID code reader processes the ID code and/or data from the transponder chips to provide relevant information to a user about the item that is tagged. The switch has a position, or positions, representative of a physical quantity, such as the pressure in the tire, for example. When the switch is shorted, wherein both inputs of the transponder chips are shorted together, the effect of the capacitor is nullified. When the switch is is open, then the return signal from the second transponder chip has a small phase shift with respect to the signal from the first transponder chip. The phase detection circuitry in the receiver detects this phase shift and determines the state of the switch.

The above-cited U.S. patent application describes different ways of using multiple RF/ID transponder chips disposed on one identification tag to increase the data capacity of the tag. The present invention provides an improved RF identification system for transmitting static data stored in the plurality of transponder chips that is transmitted from the ID tag, plus an additional bit of variable data representative of the external stimulus. This single bit of data is generated in response to the position of the contact closure switch on the identification tag, and may be representative of the state of the pressure switch, or other predetermined variable, such as temperature, or magnetic field strength, for example.

The present invention provides for ability to use the RF identification tag in a remote or inaccessible position to determine the state of a variable (the position of the switch, for example) as well as store identification data. An example of this is an identification tag in a vehicle tire that stores the tire ID and also enables the reading of a pressure switch to confirm adequate tire pressure.

The present invention has been developed for use with tire identification and pressure monitoring systems, such as those developed by the assignee of the present invention. However, the present invention has other uses, such as remote temperature sensing (thermostat) or magnetic field sensing, for example. The present invention also enables the use of existing RF/ID transponder chips to generate the extra bit of data without necessitating a costly and time-consuming development of a custom transponder chip.

BRIEF DESCRIPTION OF THE DRAWINGS

The various features and advantages of the present invention may be more readily understood with reference to the following detailed description taken in conjunction with the accompanying drawings, and wherein the sole figure of the drawing illustrates an identification system in accordance with the principles of the present invention that produces one bit of variable data representative of an external stimulus.

DETAILED DESCRIPTION

Referring to the drawing figure, it illustrates an RF identification system 10 in accordance with the principles of the present invention. The RF identification system 10 generates data indicative of an item that is tagged, and produces one bit of variable data representative of an external stimulus that is generally associated with the item that is tagged.

The RF identification system 10 comprises an RF identification tag 11 and an ID code reader 20. The RF identification tag 11 comprises an RF transponder 12, including first and second RF transponder chips 12a, 12b, and an excitation coil 13. The RF identification tag 11 is placed on an item that is to be monitored, such as a tire 17, for example. The first and second RF transponder chips 12a, 12b of the RF transponder 12 stores an ID code and other relevant information or data relating to the item (tire 17) that is to be monitored. The transponder chips 12a, 12b may be a type 1495 transponder chip manufactured by Hughes Aircraft Company, for example. The type 1495 transponder chip is designed and functions as described in U.S. Pat. No. 4,730,188 issued to Milheiser. The 1495 transponder chip 12 operates at a typical carrier frequency of 125 KHz, for example. The excitation coil 13 in the identification tag 11 has the requisite number of turns to properly function at this carrier frequency.

The RF identification tag 11 further comprises a switch 14 coupled between antenna inputs of the respective transponder chips 12a, 12b and coupled to the excitation coil 13. A capacitor 15 is also coupled between the antenna inputs of the respective transponder chips 12a, 12b. The capacitor 15 is therefore coupled across the switch 14. A sensor, such as a pressure sensor 16 is provided, and is adapted to sense the pressure in the tire 17, for example. The pressure sensor 16 is used to produce one bit of variable data representative of the external stimulus (the pressure in the tire 17).

The ID code reader 20 comprises an exciter 21 coupled to an RF excitation coil 22 and a receiver 23 coupled to an RF receiver coil 24. The receiver and exciter coils 22, 24 may be combined into a single coil 22 with a corresponding small loss in performance. The ID code reader 20 further comprises phase detection circuitry 25 that is part of the receiver 23 that are used to detect the state of the switch by detecting the phase shift between signals sent by each of the transponder chips 12a, 12b. Such phase detection circuitry 25 is generally well-known to those skilled in the art and will not be described n detail herein. However, reference is made to U.S. Pat. No. 4,053,836 issued to Fellrath, that describes phase detection circuitry that may readily be adapted for use with the present invention.

In operation, the ID code reader 20 queries the RF identification tag 11 using a transmitted RF signal generated by the exciter 21. The transponder chips 12a, 12b respond to the transmitted RF signal or query from the exciter 21 and an ID code or other data is read out of a selected transponder chip 12a, 12b by way of the RF excitation coil 13 coupled thereto. The ID code reader 20 receives the ID code and/or data from the selected transponder chip 12a, 12b by way of the RF receiver coil 24 and receiver 23, and processes the information to provide relevant information to a user about the item (tire 17) that is tagged. The exciter 21, transponder chips 12a, 12b, receiver 23 and the respective excitation and receiver coils 22, 24, 13 used in the RF identification system 10 are designed to process carrier signals that are typically on the order of 125 KHz.

The switch 14 has a position, or positions, representative of a physical quantity, such as pressure in the tire 17, for example. When the switch 14 is shorted, wherein both inputs of the transponder chips 12a, 12b are shorted together, the effect of the capacitor 15 is nullified. When the switch 14 is open, then the return signal from the second transponder chip 12b has a small phase shift with respect to the signal from the first transponder chip 12a. The phase detection circuitry 25 in the receiver 23 detects this phase shift and determines the state of the switch 14.

Thus there has been described a new and improved an RF identification system that that provides static data indicative of an item that is tagged and one bit of variable data representative of an external stimulus. It is to be understood that the above-described embodiment is merely illustrative of some of the many specific embodiments which represent applications of the principles of the present invention. Clearly, numerous and other arrangements can be readily devised by those skilled in the art without departing from the scope of the invention.

What is claimed is:

1. An RF identification system for generating data indicative of an item that is tagged, and one bit of variable data representative of an external stimulus, said system comprising:

an RF identification tag coupled to the item that is to be monitored that comprises:
first and second RF transponder chips that each store data relating to the item that is to be monitored and that each comprise first and second antenna outputs;
an excitation coil having one input coupled to respective first antenna outputs of the first and second RF transponder chips;
a switch coupled between respective second antenna outputs of the first and second RF transponder chips and coupled to a second input of the excitation coil;
a capacitor coupled across the switch; and
a sensor coupled to the switch for generating one bit of variable data representative of an external stimulus; and an ID code reader that comprises:
an exciter;
an RF excitation coil coupled to the exciter;
a receiver comprising an RF receiver coil and phase detection circuitry for detecting a state of the switch by detecting the phase shift between signals received from each of the transponder chips.

2. The RF identification system of claim 1 wherein the item comprises a tire.

3. The RF identification system of claim 1 wherein the sensor comprises a pressure sensor.

4. The RF identification system of claim 3 wherein the item comprises a tire.

5. The RF identification system of claim 2 wherein the one bit of variable data representative of the external stimulus is representative of the pressure in the tire.

6. The RF identification system of claim 4 wherein the one bit of variable data representative of the external stimulus is representative of the pressure in the tire.

7. In an RF identification system that comprises an RF identification tag coupled to the item that is to be monitored for generating data indicative of the item, and an ID code reader comprising an exciter, an RF excitation coil coupled to the exciter, and a receiver comprising an RF receiver coil and phase detection circuitry for detecting a state of the switch by detecting the phase shift between signals received from identification tag, wherein the improvement comprises an RF identification tag for generating the data indicative of the item, and one bit of variable data representative of an external stimulus, said identification tag comprising:

first and second RF transponder chips that each store data relating to the item that is to be monitored and that each comprise first and second antenna outputs;

an excitation coil having one input coupled to respective first antenna outputs of the first and second RF transponder chips;

a switch coupled between respective second antenna outputs of the first and second RF transponder chips and coupled to a second input of the excitation coil;

a capacitor coupled across the switch; and a sensor coupled to the switch for generating one bit of variable data representative of the external stimulus.

8. The RF identification system of claim 7 wherein the item comprises a tire.

9. The RF identification system of claim 7 wherein the sensor comprises a pressure sensor.

10. The RF identification system of claim 9 wherein the item comprises a tire.

11. The RF identification system of claim 8 wherein the one bit of variable data representative of the external stimulus is representative of the pressure in the tire.

12. The RF identification system of claim 10 wherein the one bit of variable data representative of the external stimulus is representative of the pressure in the tire.

* * * * *